(12) United States Patent
Neri et al.

(10) Patent No.: US 8,303,851 B2
(45) Date of Patent: Nov. 6, 2012

(54) MIXTURES OF ADDITIVES FOR ORGANIC POLYMERS IN GRANULAR FORM

(75) Inventors: Carlo Neri, Milan (IT); Corrado Callierotti, Bergamo (IT)

(73) Assignee: Great Lakes Chemical (Europe) GmbH, Frauenfeld (CH)

( * ) Notice: Subject to any disclaimer, the term of this patent is extended or adjusted under 35 U.S.C. 154(b) by 801 days.

(21) Appl. No.: 12/016,780

(22) Filed: Jan. 18, 2008

(65) Prior Publication Data

US 2008/0194766 A1 Aug. 14, 2008

Related U.S. Application Data

(63) Continuation of application No. 09/692,025, filed on Oct. 19, 2000, now abandoned.

(30) Foreign Application Priority Data

Oct. 21, 1999 (IT) .................. MI99A2205

(51) Int. Cl.
*C09K 15/02* (2006.01)
*C09K 15/04* (2006.01)
*C09K 15/06* (2006.01)
*C09K 15/08* (2006.01)
*C09K 15/16* (2006.01)
*C09K 15/20* (2006.01)
*C09K 15/32* (2006.01)

(52) U.S. Cl. .............. 252/399; 252/400.21; 252/400.23; 252/400.24; 252/400.5; 252/400.52; 252/400.54; 252/400.62; 252/401; 252/403; 252/404; 252/405; 252/406; 252/407; 252/186.26; 252/186.27; 106/401; 106/419; 106/448; 106/458; 106/498; 106/496; 106/497

(58) Field of Classification Search .................. 252/399, 252/397, 400.21, 400.23, 400.24, 400.5, 252/400.52, 400.53, 400.54, 400.62, 401, 252/403, 404, 405, 406, 407, 186.25, 186.26, 252/186.27; 106/401, 410, 419, 425, 448, 106/458, 498, 496, 497

See application file for complete search history.

(56) References Cited

U.S. PATENT DOCUMENTS

| | | | | |
|---|---|---|---|---|
| 4,729,796 A * | 3/1988 | Deubel et al. | ................. | 106/413 |
| 4,999,138 A * | 3/1991 | Nebashi et al. | ............... | 510/324 |
| 5,017,195 A * | 5/1991 | Satou et al. | ...................... | 8/526 |
| 5,173,116 A * | 12/1992 | Roth | ............................ | 106/401 |
| 5,437,688 A * | 8/1995 | Yamauchi et al. | ............... | 8/526 |
| 5,455,288 A * | 10/1995 | Needham | ..................... | 523/205 |
| 5,888,254 A * | 3/1999 | Gang et al. | ........................ | 8/526 |
| 6,126,862 A * | 10/2000 | Semen | ......................... | 252/404 |
| 6,740,694 B2 * | 5/2004 | Thibaut et al. | .................. | 524/94 |
| 6,800,228 B1 * | 10/2004 | Semen | ......................... | 264/109 |
| 2001/0023269 A1 * | 9/2001 | Thibaut et al. | ................... | 524/91 |
| 2004/0143040 A1 * | 7/2004 | Metz et al. | ....................... | 524/88 |
| 2005/0006627 A1 * | 1/2005 | Semen | ......................... | 252/399 |

FOREIGN PATENT DOCUMENTS

EP  0 514 784 A1 * 11/1992

* cited by examiner

*Primary Examiner* — Joseph D Anthony

(74) *Attorney, Agent, or Firm* — Joseph Suhadolnik

(57) ABSTRACT

Mixtures of additives in granular form comprising:
  one or more stabilizers for organic polymers;
  one or more organic or inorganic pigments; and/or
  one or more dyes;
obtained by extrusion at a temperature capable of enabling the partial or total melting of the lowest-melting component.
The above mixtures can be used in the stabilization and dyeing of organic polymers.

13 Claims, No Drawings

US 8,303,851 B2

MIXTURES OF ADDITIVES FOR ORGANIC POLYMERS IN GRANULAR FORM

CROSS-REFERENCE TO RELATED APPLICATIONS

This application is a continuation of U.S. patent application Ser. No. 09/692,025, filed Oct. 19, 2000, and claims priority to Italian Patent Application Number MI99A 002205 filed Oct. 21, 1999 the disclosure of which is expressly incorporated herein by reference.

The present invention relates to mixtures of additives for organic polymers in granular form.

More specifically, the present invention relates to mixtures of additives for organic polymers in granular form comprising one or more stabilizers for organic polymers, one or more organic or inorganic pigments and/or one or more dyes, obtained by extrusion at a temperature capable of enabling the partial or total melting of the lowest-melting component and their use in the stabilization and dyeing of organic polymers.

The present invention also relates to the polymeric compositions stabilized and dyed with the above mixtures and the end-products obtained by their processing.

As is known, most additives for organic polymers are in powder form. These powders, when used during the processing of organic polymers, have the disadvantage of being dispersed in the air and can damage the health of the operators as well as creating safety problems due to the possibility of explosions.

Another drawback in the use of additives in powder form is the possibility of their thickening in the feeding hoppers, thus obtaining inconstant dosages of the additives in the polymer.

The use of additives in powder form, moreover, makes it difficult to obtain complete homogenization between the various components of the mixture and consequently between these and the organic polymer to be stabilized, thus causing heterogeneity in the stabilization.

It is known that there is a growing demand on the market for additives in solid form.

For this purpose, resort has been made to granulation systems using dry compacting machines or pellet mills, or using so-called "masterbatches" containing the organic polymer to be stabilized and one or more additives in a quantity ranging from 2.5% to 60%.

Solid stabilizing mixtures for organic polymers can be obtained as described, for example, in European patent EP 565,184: the solid mixtures obtained consist of two or more stabilizers for organic polymers but no reference is made to the possibility of introducing organic or inorganic pigments and/or one or more dyes, into these mixtures.

As organic or inorganic pigments and dyes are also generally in powder form, their use in organic polymers has the same disadvantages described above.

U.S. Pat. No. 4,604,100 describes a process for the preparation of formulations of dyes in granular form using polyethylene glycol as carrier.

U.S. Pat. No. 4,194,921, on the other hand, describes a process for obtaining pigments in the form of beads without powders: also in this case the process is carried out in the presence of carriers.

The Applicant has now found that it is possible to obtain mixtures of additives for organic polymers in granular form comprising one or more stabilizers for organic polymers, one or more organic or inorganic pigments and/or one or more dyes, by means of extrusion at a temperature capable of enabling the partial or total melting of the lowest-melting component. The extrusion temperature is much lower than the temperature at which the additives are processed in the case of masterbatches, and the additives used are therefore subjected to less thermal stress. In addition, carriers are not used, thus avoiding the introduction of foreign components into the organic polymer to which the mixtures are to be added.

An object of the present invention therefore relates to mixtures of additives in granular form comprising:
one or more stabilizers for organic polymers;
one or more organic or inorganic pigments; and/or
one or more dyes;
obtained by extrusion at a temperature capable of enabling the partial or total melting of the lowest-melting component.

Stabilizers for organic polymers useful for the purposes of the present invention are selected from the following groups:

1. Antioxidants 1.1 Alkylated monophenols such as, for example: 2,6-di-t-butyl-4-methylphenol; 2-t-butyl-4,6-dimethylphenol; 2,6-di-t-butyl-4-ethylphenol; 2,6-di-t-butyl-4-n-butyl-phenol; 2,6-di-t-butyl-4-isobutylphenol; 2,6-dicyclo-pentyl-4-methylphenol; 2-(α-methylcyclohexyl)-4,6-dimethylphenol; 2,6-dioctadecyl-4-methylphenol; 2,4,6-tricyclohexylphenol; 2,6-di-t-butyl-4-methoxymethylphenol; nonylphenols with a linear or branched alkyl chain such as, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyl-tridec-1'-yl) phenol; and their mixtures.

1.2 Alkylthiomethylphenols such as, for example: 2,4-dioctylthiomethyl-6-t-butylphenol; 2,4-dioctylthiomethyl-6-methylphenol; 2,4-dioctylthiomethyl-6-ethylphenol; 2,6-di-dodecylthiomethyl-4-nonylphenol.

1.3 Hydroquinones and alkylated hydroquinones such as, for example: 2,6-di-t-butyl-4-methoxyphenol; 2,5-di-t-butylhydroquinone; 2,5-di-t-amylhydroquinone; 2,6-di-phenyl-4-octadecyloxyphenol; 2,6-di-t-butylhydroquinone; 2,5-di-t-butyl-4-hydroxyanisol; 3,5-di-t-butyl-4-hydroxyanisol; 3,5-di-t-butyl-4-hydroxyphenyl stearate; bis(3,5-di-t-butyl-4-hydroxyphenyl)adipate.

1.4 Tocopherols such as, for example: α-tocopherol, β-tocopherol, γ-tocopherol, δ-tocopherol and their mixtures (Vitamin E).

1.5 Hydroxylated thiodiphenyl ethers such as, for example 2,2'-thiobis-(6-t-butyl-4-methylphenol); 2,2'-thiobis-(4-octylphenol); 4,4'-thiobis-(6-t-butyl-3-methylphenol); 4,4'-thiobis-(6-t-butyl-2-methylphenol); 4,4'-thiobis-(3,6-di-s-amylphenol); 4,4'-bis-(2,6-dimethyl-4-hydroxy-phenyl) disulfide.

1.6 Alkylidene-bisphenols such as, for example: 2,2'-methylenebis-(6-t-butyl-4-methylphenol); 2,2'-methylene-bis-(6-t-butyl-4-ethylphenol); 2,2'-methylenebis[4-methyl-6-(α-methylcyclohexyl)phenol]; 2,2'-methylene-bis(4-methyl-6-cyclohexylphenol); 2,2'-methylenebis(6-nonyl-4-methylphenol); 2,2'-methylenebis(4,6-di-t-butyl-phenol); 2,2'-ethylidene-bis(4,6-di-t-butylphenol); 2,2'-ethylidenebis(6-t-butyl-4-isobutylphenol); 2,2'-methylene-bis[6-(α-methylbenzyl)-4-nonylphenol]; 2,2'-methylene-bis[6-(α,α-dimethylbenzyl)-4-nonylphenol]; 4,4'-methylenebis(2,6-di-t-butylphenol); 4,4'-methylenebis(6-t-butyl-2-methylphenol); 1,1-bis(5-t-butyl-4-hydroxy-2-methyl-phenyl)butane; 2,6-bis(3-t-butyl-5-methyl-2-hydroxybenzyl)-4-methylphenol; 1,1,3-tris-(5-t-butyl-4-hydroxy-2-methylphenyl)butane; 1,1-bis(5-t-butyl-4-hydroxy-2-methylphenyl)-3-n-dodecyl-mercaptobutane; ethyleneglycol bis[3,3-bis-(3'-t-butyl-4'-hydroxyphenyl)butyrate]; bis(3-t-butyl-4-hydroxy-5-methylphenyl)dicyclopentadiene; bis[2-(3-t-butyl-2'-hydroxy-5'-methylbenzyl)-6-t-butyl-4-methylphenyl]terephthalate; 1,1-bis(3,5-dimethyl- 2-hydroxyphenyl)butane; 2,2-bis-(3,5-di-t-butyl-4-hydroxyphenyl)propane; 2,2-bis(5-t-butyl-4-hydroxy-2-methylphenyl)-4-n-dodecylmercaptobutane; 1,1,5,5-tetra(5-t-butyl-4-hydroxy-2-methylphenyl)pentane.

1.7 Benzyl compounds containing O, N or S such as, for example: 3,5,3',5'-tetra-t-butyl-4,4'-dihydroxydibenzylether; octadecyl-4-hydroxy-3,5-dimethylbenzylmercaptoacetate; tridecyl-4-hydroxy-3,5-di-t-butyl-benzylmercaptoacetate; tris(3,5-di-t-butyl-4-hydroxybenzyl)amine; bis(4-t-butyl-3-hydroxy-2,6-dimethylbenzyl)dithioterephthalate; bis(3,5-di-t-butyl-4-hydroxybenzyl)sulfide; iso-octyl-3,5-di-t-butyl-4-hydroxybenzylmercaptoacetate.

1.8 Hydroxybenzylated malonates such as, for example: dioctadecyl-2,2-bis(3,5-di-t-butyl-2-hydroxybenzyl)malonate; dioctadecyl-2-(3-t-butyl-4-hydroxy-5-methylbenzyl)malonate; didodecylmercaptoethyl-2,2-bis(3,5-di-t-butyl-4-hydroxybenzyl)malonate; bis[4-(1,1,3,3-tetramethylbutyl)phenyl]-2,2-bis(3,5-di-t-butyl-4-hydroxybenzyl)malonate.

1.9 Aromatic hydroxybenzyl compounds such as, for example: 1,3,5-tris(3,5-di-t-butyl-4-hydroxybenzyl)-2,4,6-trimethylbenzene; 1,4-bis-(3,5-di-t-butylhydroxybenzyl)-2,3,5,6-tetramethylbenzene; 2,4,6-tris(3,5-di-t-butyl-4-hydroxybenzyl)phenol.

1.10 Triazine compounds such as, for example: 2,4-bis(octylmercapto)-6-(3,5-di-t-butyl-4-hydroxyanilino)-1,3,5-triazine; 2-octylmercapto-4,6-bis (3,5-di-t-butyl-4-hydroxyanilino)-1,3,5-triazine; 2-octylmercapto-4,6-bis-(3,5-di-t-butyl-4-hydroxyphenoxy)-1,3,5-triazine; 2,4,6-tris-(3,5-di-t-butyl-4-hydroxyphenoxy)-1,2,3-triazine; 1,3,5-tris (3,5-di-t-butyl-4-hydroxybenzyl)isocyanurate; 1,3,5-tris(4-t-butyl-3-hydroxy-2,6-dimethylbenzyl)iso-cyanurate; 2,4,6-tris-(3,5-di-t-butyl-4-hydroxyphenylethyl)-1,3,5-triazine; 1,3,5-tris (3,5-di-t-butyl-4-hydroxyphenylpropionyl)hexahydro-1,3,5-triazine; 1,3,5-tris (3,5-dicyclohexyl-4-hydroxybenzyl) isocyanurate.

1.11 Benzylphosphonates such as, for example: dimethyl-2,5-di-t-butyl-4-hydroxybenzylphosphonate; diethyl-3,5-di-t-butyl-4-hydroxybenzylphosphonate; dioctadecyl-3,5-di-t-butyl-4-hydroxybenzylphosphonate; dioctadecyl-5-t-butyl-4-hydroxy-3-methylbenzylphosphonate; calcium salts of monoethyl ester of 3,5-di-t-butyl-4-hydroxybenzylphosphonic acid.

1.12 Acylaminophenols such as, for example: 4-hydroxylauranilide; 4-hydroxystearanilide; octyl-N-(3,5-di-t-butyl-4-hydroxyphenyl)carbamate.

1.13 Esters of β-(3,5-di-t-butyl-4-hydroxyphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis (hydroxyethyl) oxalamide, 3-thioundecanol, 3-thio-pentadecanol, trimethylhexanediol, trimethylolpropane, 4-hydroxymethyl-1-phospho-2,6,7-trioxabicyclo[2.2.2]-octane.

1.14 Esters of β-(5-t-butyl-4-hydroxy-3-methylphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis-(hydroxyethyl) examide, 3-thioundecanol, 3-thiopentadecanol, trimethylhexanediol, trimethylolpropane, 4-hydroxymethyl-1-phospho-2,6,7-trioxabicyclo[2.2.2]-octane.

1.15 Esters of β-(3,5-dicyclohexyl-4-hydroxyphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis-(hydroxyethyl) oxamide, 3-thioundecanol, 3-thiopentadecanol, trimethylhexanediol, trimethylolpropane, 4-hydroxymethyl-1-phospho-2,6,7-trioxabicyclo[2.2.2]-octane.

1.16 Esters of (3,5-di-t-butyl-4-hydroxyphenyl)acetic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis (hydroxyethyl) oxamide, 3-thioundecanol, 3-thiopentadecanol, trimethylhexanediol, trimethylolpropane, 4-hydroxymethyl-1-phospho-2,6,7-trioxabicyclo[2.2.2]-octane.

1.17 Amides of β-(3,5-di-t-butyl-4-hydroxyphenyl)propionic acid such as, for example: N,N'-bis(3,5-di-t-butyl-4-hydroxyphenylpropionyl)hexamethylenediamide; N,N'-bis-(3,5-di-t-butyl-4-hydroxyphenylpropionyl) trimethylenediamide; N,N'-bis (3,5-di-t-butyl-4-hydroxyphenylpropionyl)hydrazide; N,N'-bis[2-(3-[3,5-di-t-butyl-4-hydroxyphenyl]propionyl-oxy)ethyl]oxamide (Naugard® XL-1 of Uni-royal).

1.18 Ascorbic acid (vitamin C).

1.19 Amine antioxidants such as, for example, N,N'-di-isopropyl-p-phenylenediamine; N,N'-di-s-butyl-p-phenylenediamine; N,N'-bis (1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-dicyclohexyl-p-phenylenediamine; N,N'-diphenyl-p-phenylenediamine; N,N'-bis(2-naphthyl)-p-phenylenediamine; N-isopropyl-N'-phenyl-p-phenylenediamine; N-(1,3-dimethylbutyl)-N'-phenyl-p-phenylenediamine; N-(1-methylheptyl)-N'-phenyl-p-phenylenediamine; N-cyclohexyl-N'-phenyl-p-phenylenediamine; 4-(p-toluenesulfamoyl)di-phenylamine; N,N'-dimethyl-N,N'-di-s-butyl-p-phenylenediamine; diphenylamine; N-allyldiphenylamine; 4-isopropoxydiphenylamine; N-phenyl-1-naphthylamine; N-(4-t-octylphenyl)1-naphthylamine; N-phenyl-2-naphthylamine; diphenylamine octylate such as, for example, p,p'-di-t-octyldiphenylamine; 4-n-butylaminophenol; 4-butirylaminophenol; 4-nonanoylaminophenol; 4-dodecanoylaminophenol; 4-octadecanoylaminophenol; bis (4-methoxyphenyl)amine; 2,6-di-t-butyl-4-dimethylaminomethylphenol; 2,4'-diaminodiphenylmethane; 4,4"-diaminodiphenylmethane; N,N,N',N'-tetramethyl-4,4'-diaminodiphenylmethane; 1,2-bis[(2-methylphenyl)amino] ethane; 1,2-bis(phenylamino)propane; (o-tolyl)biguanide; bis[4-(1',3'-dimethylbutyl)phenyl]amine; N-phenyl-1-naphthylamine t-octylate; mixture of mono- and dialkylated t-butyl/t-octyldiphenylamines; mixture of mono- and dialkylated nonyldiphenylamines; mixture of mono- and dialkylated dodecyldiphenylamines; mixture of mono- and dialkylated isopropyl/isohexyldiphenylamines; mixture of mono- and dialkylated t-butyldiphenylamines; 2,3-dihydro-3,3-dimethyl-4H-1,4-benzothiazine; phenothiazine; mixture of mono- and dialkylated t-butyl/t-octyl-phenothiazines; mixture of mono- and dialkylated t-octyl-phenothiazines; N-allyl-phenothiazine; N,N,N',N'-tetra-phenyl-1,4-diaminobut-2-ene; N,N-bis(2,2,6,6-tetramethyl-piperid-4-yl)

hexamethylenediamine; bis-(2,2,6,6-tetramethylpiperidin-4-yl)sebacate; 2,2,6,6-tetramethylpiperidin-4-one; 2,2,6,6-tetramethylpiperidin-4-ol.

2. UV ray and light stabilizers.

2.1 Derivatives of 2-(2'-hydroxyphenyl)benzotriazoles such as, for example: 2-(2'-hydroxy-5'methylphenyl)benzotriazole; 2-(3',5'-di-t-butyl-2'-hydroxyphenyl)benzotriazole; 2-(5'-t-butyl-2'-hydroxyphenyl)benzotriazole; 2-[2'-hydroxy-5'-(1,1,3,3-tetramethylbutyl)phenyl]benzotriazole; 2-(3',5'-di-t-butyl-2'-hydroxyphenyl)-5-chlorobenzotriazole; 2-(3'-t-butyl-2'-hydroxy-5'-methylphenyl)-5-chlorobenzotriazole; 2-(3'-s-butyl-5'-t-butyl-2'-hydroxyphenyl)benzotriazole; 2-(2'-hydroxy-4'-octyloxyphenyl)benzotriazole; 2-(3',5'-di-t-amyl-2'-hydroxyphenyl)benzotriazole; 2-[3',5'-bis($\alpha$,$\alpha$-dimethylbenzyl)-2'-hydroxyphenyl]benzotriazole; 2-[3'-t-butyl-2'-hydroxy-5'-(2-octyloxycarbonylethyl)phenyl]-5-chlorobenzotriazole, 2-[3'-t-butyl-5'-(2-(2-ethylhexyloxy)carbonylethyl)-2'-hydroxyphenyl]-5-chlorobenzo-triazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3-t-butyl-2'-hydroxy-5'-(2-octyloxycarbonylethyl)phenyl]-benzotriazole, 2-[3'-t-butyl-5'-(2-(2-ethylhexyloxy)carbonylethyl)-2'-hydroxyphenyl]benzotriazole, 2-(3'-dodecyl-2'-hydroxy-5'-methylphenyl)benzotriazole; 2-[3'-t-butyl-2'-hydroxy-5'-(2-iso-octyloxycarbonylethyl)phenyl]benzotriazole, 2,2'-methylene-bis[4-(1,1,3,3-tetramethylbutyl)-6-benzotriazol-2-yl-phenol]; transesterification product of 2-[3'-t-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$— wherein R=3'-t-butyl-4-hydroxy-5'-2H-benzotriazol-2-yl-phenyl; 2-[2'-hydroxy-3'-($\alpha$,$\alpha$-dimethylbenzyl)-5'-(1,1,3,3-tetramethylbutyl)phenyl]benzotriazole; 2-[2'-hydroxy-3'-(1,1,3,3-tetramethylbutyl)-5'-($\alpha$,$\alpha$-dimethylbenzyl)phenyl]benzotriazole.

2.2 Derivatives of 2-hydroxybenzophenones such as, for example: 4-hydroxy-; 4-methoxy-; 4-octyloxy-; 4-decyloxy-; 4-dodecyloxy-; 4-benzyloxy-; 4,2',4'-trihydroxy-; 2'-hydroxy-4,4'-dimethoxy.

2.3 Esters of benzoic acids, optionally substituted, such as, for example: phenyl salicylate, 4-t-butylphenyl salicylate, octylphenyl salicylate, benzoyl resorcinol, bis(4-t-butylbenzoyl)resorcinol, dibenzoyl resorcinol, 2,4-di-t-butylphenyl-3,5-di-t-butyl-4-hydroxybenzoate, hexadecyl-3,5-di-t-butyl-4-hydroxybenzoate, octadecyl-3,5-di-t-butyl-4-hydroxybenzoate, 2-methyl-4,6-di-t-butylphenyl-3,5-di-t-butyl-4-hydroxybenzoate.

2.4 Acrylates such as, for example, ethyl or isoctyl $\alpha$-cyano-$\beta$,$\beta$-diphenylacrylate; methyl $\alpha$-carbomethoxycinnamate, methyl or butyl $\alpha$-cyano-$\beta$-methyl-p-methoxycinnamate, methyl $\alpha$-carbomethoxy-p-methoxycinnamate, N-($\beta$-carbomethoxy-$\beta$-cyanovinyl)-2-methylindoline.

2.5 Nickel compounds such as, for example, Ni complexes of 2,2'-thio-bis-[4-(1,1,3,3-tetramethylbutyl)phenol], for example 1:1 or 1:2 complexes, with or without additional binders such as n-butylamine, triethanolamine or N-cyclohexyldiethanolamine, nickel dibutyldithiocarbamate, nickel salts of monoalkyl esters of 4-hydroxy-3,5-di-t-butyl-benzylphosphonic acid, such as methyl or ethyl esters, nickel complexes with ketoximes such as 2-hydroxy-4-methylphenyl undecylketoxime, nickel complexes of 1-phenyl-4-lauroyl-5-hydroxypyrazol with or without additional binders.

2.6 Sterically hindered amines and their N-alkoxy derivatives such as, for example: poly-methylpropyl-3-oxy-[4-(2,2,6,6-tetramethyl)piperidinyl]siloxane, polymethylpropyl-3-oxy-[4-(1,2,2,6,6-pentamethyl)piperidinyl]siloxane, bis-(2,2,6,6-tetramethyl-4-piperidinyl)sebacate; bis (2,2,6,6-tetramethyl-4-piperidinyl)succinate; bis (1,2,2,6,6-pentamethyl-4-piperidinyl)sebacate; bis(1-octyloxy-2,2,6,6-tetramethyl-4-piperidinyl)sebacate; bis-(1,2,2,6,6-pentamethyl-4-piperidyl)n-butyl-3,5-di-t-butyl-4-hydroxybenzylmalonate; condensation product between 1-(2-hydroxyethyl)-2,2,6,6-tetra-4-hydroxypiperidine and succinic acid; condensation product, linear or cyclic, between N,N'-bis(2,2,6,6-tetramethyl-4-piperidyl)hexamethylenediamine and 4-t-octylamino-2,6-dichloro-1,3,5-s-triazine; tris(2,2,6,6-tetramethyl-4-piperidyl) nitrilotriacetate; tetrakis(2,2,6,6-tetramethyl-4-piperidinyl)-1,2,3,4-butanetetracarboxylate; 1,1'-(1,2-ethanodiyl)bis (3,3,5,5-tetramethylpiperazinone; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-t-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; condensation product, linear or cyclic, between N,N'-bis(2,2,6,6-tetramethyl-4-piperidyl)hexamethylenediamine and 4-morpholine-2,6-dichloro-1,3,5-triazine; condensation product between 2-chloro-4,6-di-(4-n-butylamino-2,2,6,6-tetramethylpiperidyl)-1,3,5-triazine and 1,2-bis(3-aminopropylamino) ethane; condensation product between 2-chloro-4,6-di-(4-n-butylamino-1,2,2,6,6-pentamethylpiperidyl)-1,3,5-triazine and 1,2-bis(3-aminopropylamino)ethane; 8-acetyl-3-dodecyl-7,7,-9,9-tetramethyl-1,3,8-triazaspiro-[4.5]decano-2,4-dione; 3-dodecyl-1-(2,2,6,6-tetramethyl-4-piperidyl)pyrrolidin-2,5-dione; 3-dodecyl-1-(1,2,2,6,6-pentamethyl-4-piperidyl)pyrrolidin-2,5-dione; mixture of 4-hexadecyloxy- and 4-stearyloxy-2,2,6,6-tetramethylpiperidine; condensation product between N-N'-bis(2,2,6,6-tetramethyl-4-piperidyl)hexamethylenediamine and 4-cyclohexylamino-2,6-dichloro-1,3,5-triazine; condensation product between 1,2-bis(3-aminopropylamino) ethane and 2,4,6-trichloro-1,3,5-triazine, as well as 4-butylamino-2,2,6,6-tetramethylpiperidine (CAS Reg. Nr. [136504-96-6]; N-(2,2,6,6-tetramethyl-4-piperidyl)-n-dodecylsuccinimide; N-(1,2,2,6,6-pentamethyl-4-piperidyl)-n-dodecylsuccinimide; 2-undecyl-7,7,9,9-tetramethyl-1-oxa-3,8-diaza-4-oxospiro[4,5]decane; reaction product between 7,7,9,9-tetramethyl-2-cycloundecyl-1-oxa-3,8-diaza-4-oxospiro-[4,5]decane and epichlorohydrin; 1,1-bis(1,2,2,6,6-pentamethyl-4-piperidyloxycarbonyl)-2-(4-methoxyphenyl) ethene; N,N'-bis-formyl-N,N'-bis(2,2,6,6-tetramethyl-4-piperidyl)hexamethylenediamine; diester of 4-methoxymethylenemalonic acid with 1,2,2,6,6-pentamethyl-4-hydroxypiperidine; reaction product of maleic anhydride/$\alpha$-olefin copolymer with 2,2,6,6-tetramethyl-4-aminopiperidine or with 1,1,2,2,6-pentamethyl-4-aminopiperidine.

2.7 Oxamides such as, for example: 4,4'-dioctyloxyoxanilide; 2,2'-diethoxyoxanilide; 2,2'-dioctyloxy-5,5'-di-t-butoxanilide; 2,2'-didodecyloxy-5,5'-di-t-butoxanilide; 2-ethoxy-2'-ethyloxanilide; N,N'-bis(3-dimethylaminopropyl)oxamide; 2-ethoxy-5-t-butyl-2'-ethoxanilide and its mixtures with 2-ethoxy-2'-ethyl-5,4'-di-t-butoxanilide; and mixtures of disubstituted ortho- and para-methoxy oxanilides and mixtures of disubstituted ortho and para-ethoxy oxanilides.

2.8 2-(2-hydroxyphenyl)-1,3,5-triazines such as, for example: 2,4,6-tris(2-hydroxy-4-octyloxyphenyl)-1,3,5-triazine; 2-(2-hydroxy-4-octyloxyphenyl)-4,6-bis(2,4-dimethylphenyl)-1,3,5-triazine; 2-(2,4-dihydroxyphenyl)-4,6-bis-(2,4-dimethylphenyl)-1,3,5-triazine; 2,4-bis-(2-hydroxy-4-propyloxyphenyl)-6-(2,4-dimethylphenyl)-1,3,5-triazine; 2-(2-hydroxy-4-octyloxyphenyl)-4,6-bis(4-methylphenyl)-

1,3,5-triazine; 2-(2-hydroxy-4-dodecyloxyphenyl)-4,6-bis (2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyloxy)phenyl]-4,6-bis-(2,4-dimethylphenyl)-1,3,5-triazine; 2-(2-hydroxy-4-tridecyloxyphenyl)-4,6-bis(2,4-dimethylphenyl)-1,3,5-triazine; 2-[4-(dodecyloxy/tridecyloxy-2-hydroxypropoxy)-2-hydroxyphenyl]-4,6-bis(2,4-dimethylphenyl)-1,3,5-triazine; 2-[2-hydroxy-4-(2-hydroxy-3-dodecyloxypropoxy) phenyl]-4,6-bis-(2,4-dimethylphenyl)-1,3,5-triazine; 2-(2-hydroxy-4-hexyloxyphenyl)-4,6-diphenyl-1,3,5-triazine; 2-(2-hydroxy-4-methoxyphenyl)-4,6-diphenyl-1,3,5-triazine; 2,4,6-tris[2-hydroxy-4-(3-butoxy-2-hydroxypropoxy) phenyl]-1,3,5-triazine; 2-(2-hydroxyphenyl)-4-(4-methoxyphenyl)-6-phenyl-1,3,5-triazine; 2-{2-hydroxy-4-[3-(2-ethylhexyl-1-oxy)-2-hydroxypropyloxy]phenyl}-4,6-bis(2, 4-dimethylphenyl)-1,3,5-triazine.

3. "Metal-deactivators" such as, for example: N,N'-diphenyloxamide, N-salicylal-N'-salicyloyl-hydrazine, N,N'-bis (salicyloyl)hydrazine, N,N'-bis(3,5-di-t-butyl-4-hydroxyphenylpropionyl)hydrazine, 3-salicyloylamino-1,2,4-triazole, bis (benzylidene)oxallyl dihydrazide, oxanilide, isophthaloyl dihydrazide, sebacoyl bisphenylhydrazide, N,N'-diacetyladipoyl dihydrazide, N,N'-bis (salicyloyl)oxallyl dihydrazide, N,-N'-bis(salicyloyl) thiopropionyl dihydrazide.

4. Phosphites and phosphonites such as, for example: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-t-butylphenyl) phosphite, diisodecyl pentaerythritol diphosphite, bis(2,4-di-t-butylphenyl) pentaerythritol diphosphite, bis(2,6-di-t-butyl-4-methylphenyl)pentaerythritol diphosphite, diisodecyloxypentaerythritol diphosphite, bis(2,4-di-t-butyl-6-methylphenyl)pentaerythritol diphosphite, bis[2,4,6-tris(t-butylphenyl)]pentaerythritol diphosphite, tristearyl sorbitol triphosphite, tetrakis-(2,4-di-t-butylphenyl)-4,4'-diphenylenediphosphonite, 6-iso-octyloxy-2,4,8,10-tetra-t-butyl-12H-dibenzo-[d,g]-1,3,2-dioxaphosphocine, 6-fluoro-2,4,8,10-tetra-t-butyl-12-methyl-dibenzo[d,g]-1,3,2-dioxaphosphocine, bis-(2,4-di-t-butyl-6-methylphenyl)methylphosphite, bis(2,4-di-t-butyl-6-methylphenyl)ethylphosphite; 2,2'2"-nitrilo[triethyl-tris(3, 3',5,5'-tetra-t-butyl-1,1'-biphenyl-2,2'-diyl)phosphite; 2-ethylhexyl-(3,3'5,5'-tetra-t-butyl-1,1'-biphenyl-2,2'-diyl) phosphite.

5. Hydroxylamines such as, for example: N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; N,N-dialkylhydroxylamines deriving from hydrogenated tallow amines.

6. Nitrons such as, for example: N-benzyl-α-phenyl-nitron; N-ethyl-α-methyl-nitron; N-octyl-α-heptyl-nitron; N-lauryl-α-undecyl-nitron; N-tetradecyl-α-tridecyl-nitron; N-hexadecyl-α-pentadecyl-nitron; N-octadecyl-α-heptadecyl-nitron; N-hexadecyl-α-heptadecyl-nitron; N-octadecyl-α-pentadecyl-nitron; N-heptadecyl-α-heptadecyl-nitron; N-octadecyl-α-hexadecyl-nitron; nitrons deriving from hydrogenated tallow amines.

7. Thiosynergizing agents such as, for example: dilauryl thiodipropionate; distearyl thiodipropionate.

8. Agents which are capable of destroying peroxides such as, for example, esters of β-thiodipropionic acid such as lauryl, stearyl, myristyl or tridecyl esters, mercaptobenzimidazole or zinc salt of 2-mercaptobenzimidazole, zinc dibutyldithiocarbamate, dioctadecyldisulfide, pentaerythritol tetrakis(β-dodecylmercapto)propionate.

9. Polyamide stabilizers such as, for example, copper salts combined with compounds of iodine and/or phosphorous, divalent manganese salts.

10. Basic co-stabilizers such as, for example: melamine, polyvinylpyrrolidone, dicyanodiamide, triallyl cyanurate, derivatives of urea, derivatives of hydrazine, amines, polyamides, polyurethanes, salts of alkaline metals and salts of earth-alkaline metals of fatty acids with a high molecular weight such as, for example, Ca-stearate, Zn-stearate, Mg-stearate, Mg-behenate, Na-ricinoleate, K-palmitate, antimonium-pyrocatecholate, tin-pyrocatecholate, zinc-pyrocatecholate.

11. Nucleating agents such as, for example: inorganic substances such as talc, metal oxides (for example, titanium dioxide or magnesium oxide), phosphates, carbonates or sulfates (preferably of earth-alkaline metals); organic compounds such as mono- or polycarboxylic acids and their salts (for example, 4-t-butylbenzoic acid, adipic acid, diphenylacetic acid, sodium succinate, sodium benzoate); polymeric compounds such as ionic copolymers ("ionomers").

12. Fillers and reinforcing agents such as, for example: calcium carbonate, silicates, glass fibres, glass beads, asbestos, talc, kaolin, mica, barium sulfate, metal oxides and hydroxides, carbon black, graphite, wood flour and flours or fibres of other natural products, synthetic fibres.

13. Other additives such as, for example: plasticizers, lubricants, emulsifying agents, Theological additives, catalysts, slip agents, optical brighteners, flame-retardants (for example bromurates, chlorurates, phosphorates and phosphorous/halogen mixtures), antistatic agents, blowing agents.

14. Benzofuranones and indolinones such as, for example: 3-[4-(2-acetoxyethoxy)phenyl]-5,7-di-t-butyl-benzofuran-2-one; 5,7-di-t-butyl-3-[4-(2-stearoyloxyethoxy)phenyl] benzofuran-2-one; 3,3'-bis[5,7-di-t-butyl-3-[4-(2-hydroxyethoxy)phenyl]benzofuran-2-one]; 5,7-di-t-butyl-3-(4-ethoxyphenyl)benzofuran-2-one; 3-(4-acetoxy-3,5-dimethylphenyl)-5,7-di-t-butyl-benzofuran-2-one; 3-(3,5-dimethyl-4-pivaloyloxyphenyl)-5,7-di-t-butyl-benzofuran-2-one; or those described in U.S. Pat. Nos. 4,325,863, 4,338, 244, 5,175,312, 5,216,052 and 5,252,643; in German E patents DE 4,316,611, 4,316,622 and 4,316,876; or in European patent applications No. 589,839 and 591,102.

Specific examples of stabilizers for organic polymers useful for the purposes of the present invention selected from those listed above are:

1,3,5-tris(3,5-di-t-butyl-4-hydroxybenzyl)-2,4,6-trimethylbenzene (known under the trade-name of IRGANOX 1330 of Ciba);
  tetrakis[3-(3,5-di-t-butyl-4-hydroxyphenyl)propionyloxymethyl]methane, both in amorphous and crystalline form, (known under the trade-names of ANOX 20 AM and ANOX 20, respectively, of Great Lakes Chemical Corporation);
  octadecyl 3-(3',5',-di-t-butyl-4'-hydroxyphenyl)propionate (known under the trade-name of ANOX PP18 of Great Lakes Chemical Corporation);
  2,2'-thiodiethylene bis[3-(3,5-di-t-butyl-4-hydroxyphenyl)propionate (known under the trade-name of ANOX 70 of Great Lakes Chemical Corporation);
  1,3,5-tris(3,5-di-t-butyl-4-hydroxybenzyl)isocyanurate (known under the trade-name of ANOX IC-14 of Great Lakes Chemical Corporation);

2-hydroxy-4-methoxybenzophenone (known under the trade-name of LOWILITE 20 of Great Lakes Chemical Corporation);

2-hydroxy-4-n-octyloxybenzophenone (known under the trade-name of LOWILITE 22 of Great Lakes Chemical Corporation);

polymethylpropyl-3-oxy-[4-(2,2,6,6-tetramethyl)piperidinyl]siloxane (known under the trade-name of UVA-SIL 299 of Great Lakes Chemical Corporation);

bis-(2,2,6,6-tetramethyl-4-piperidinyl)sebacate (known under the trade-name of LOWILITE 77 of Great Lakes Chemical Corporation);

bis-(1,2,2,6,6-pentamethyl-4-piperidinyl)sebacate (known under the trade-name of LOWILITE 76 of Great Lakes Chemical Corporation);

condensation product between 1-(2-hydroxyethyl)-2,2,6,6-tetra-4-hydroxypiperidine and succinic acid (known under the trade-name of LOWINOX 62 of Great Lakes Chemical Corporation);

condensation product, linear or cyclic, between N,N'-bis(2,2,6,6-tetramethyl-4-piperidyl)hexamethylenediamine and 4-t-octylamino-2,6-dichloro-1,3,5-s-triazine (known under the trade-name of LOWINOX 94 of Great Lakes Chemical Corporation);

tris(2,4-di-t-butylphenyl)phosphite (known under the trade-name of ALKANOX 240 of Great Lakes Chemical Corporation);

bis(2,4-di-t-butylphenyl)pentaerythritol diphosphite (known under the trade-name of ALKANOX P-24 of Great Lakes Chemical Corporation);

dilauryl thiodipropionate;

distearyl thiodipropionate;

esters of β-thiodipropionic acid such as lauryl, stearyl;

N,N'-bis(3,5-di-t-butyl-4-hydroxyphenylpropionyl)hydrazine (known under the trade-name of LOWINOX MD 24).

Organic pigments which can be used for the purposes of the present invention are selected from organic pigments of the azo type, azomethines, anthraquinones, perilenes, dioxazines, thioindigo reds, quinacridones, phthalocyanines, blue indanthrones, carbazoles (for example, purple carbazole), isoindolinones, isoindolones, benzimilazolinones, or their metal salts, etc.

Inorganic pigments which can be used for the purposes of the present invention are selected from metal oxides such as, for example, titanium dioxide, iron oxide of various colors, zinc oxide, carbon black, filler pigments such as, for example, talc, China clay, barites, carbonates, silicates, sulfosilicates, etc.

Dyes, a term herein also referring to bleaching agents, useful for the purposes of the present invention are selected from dyes which are soluble, insoluble or only slightly soluble in water.

Dyes soluble in water are, for example, acid dyes such as nitro dyes, aminoketones, ketone-imines, methines, nitrodiphenylamines, quinolines, aminonaphthoquinones, coumarins, anthraquinones, azo dyes such as monoazo or diazo dyes. These dyes contain one or more anionic groups soluble in water such as, for example, a carboxylic acid group or a sulfonic acid group and they are generally in the form of salts such as, for example, lithium, sodium, potassium or ammonium salts.

The above dyes can also be salts such as chlorides, sulfates, metasulfates, or -onium chlorides or metal halides such as, for example, tetrachlorozincates of azo dyes (monoazo, diazo or polyazo); anthraquinones, phthalocyanines, diarylmethane and triarylmethane; methine, polymethine and azomethine; thiazoles, ketone-imines, acridines, cyanines, nitro dyes, quinolines, benzimidazoles, xanthenes, azines, oxazines, thiazines and triazines which have at least one quaternary nitrogen in the molecule.

Dyes which are insoluble or only slightly soluble in water useful for the purposes of the present invention are selected from dyes containing sulfur, disperse dyes or vat dyes.

Disperse dyes are selected from nitro dyes, aminoketones, ketone-imines, methines, polymethines, diphenylamines, quinolines, benzimidazoles, xanthene, oxazines, aminonaphthoquinones, coumarins which do not contain carboxylic acid or sulfonic acid groups and are, in particular, anthraquinones and azo dyes such as monoazo and diazo dyes.

Vat dyes are those applied to fabrics in dispersed solid form and, after development, are still present in a form which is insoluble in water.

In the mixtures of additives, object of the present invention, the stabilizers for organic polymers, organic or inorganic pigments and dyes are used in any ratio, depending on the end-use.

The above mixtures of additives are added to organic polymers. Examples of organic polymers to which they can be added are:

1. Polymers of mono-olefins and di-olefins such as, for example, polypropylene, polyisobutylene, polybut-1-ene, poly-4-methylpent-1-ene, polyisoprene or polybutadiene; as well as polymers of cyclo-olefins such as, for example, cyclopentene or norbornene; polyethylene (which can be optionally cross-linked) such as, for example, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE), (VLDPE), (ULDPE).

Polyolefins such as, for example, the mono-olefins mentioned in the above paragraph, preferably polyethylene and polypropylene, can be prepared with various methods known in literature, preferably using the following methods:

(a) radical polymerization (generally carried out at a high pressure and high temperature);

(b) catalytic polymerization using a catalyst which normally contains one or more metals of groups IVb, Vb, VIb or VIII of the Periodic Table. These metals generally have one or more binders such as, for example, oxides, halides, alcoholates, esters, ethers, amines, alkyls, alkenyls and/or aryls which can be π- or α-coordinated. These metal complexes can be in free form or supported on substrates such as, for example, activated magnesium chloride, titanium(III) chloride, alumina or silicon oxide. These catalysts can be soluble or insoluble in the polymerization medium. The catalysts can be used alone or in the presence of other activators such as, for example, metal alkyls, metal hydrides, halides of metal alkyls, oxides of metal alkyls or metal alkyloxanes, these metals being elements belonging to groups Ia, IIa and/or IIIa of the Periodic Table. The activators can be conveniently modified with other ester, ether, amine or silyl-ether groups. These catalytic systems are usually called Phillips, Standard Oil Indiana, Ziegler(-Natta), TNZ (Du-Pont), metallocene or "single site catalyst" (SSC).

2. Mixtures of the polymers described under point (1) such as, for example, mixtures of polypropylene with polyisobutylene; mixtures of polypropylene with polyethylene (for example, PP/HDPE, PP/LDPE); mixtures of different types of polyethylene (for example, LDPE/HDPE).

3. Copolymers of mono-olefins and di-olefins with each other or with other vinyl monomers such as, for example, ethylene/propylene copolymers, linear low density polyethylene (LLDPE) and its mixtures with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as, for example, hexadiene, dicyclopentadiene or ethylidene-norbornene; and also mixtures of said copolymers with each other or with the polymers cited under point (1) such as, for example, polypropylene/ethylene/propylene copolymers, LDPE/ethylene/vinylacetate (EVA) copolymers, LDPE/ethylene/acrylic acid (EAA) copolymers, LLDPE/EVA, LLDPE/EAA, and alternating or random polyalkylene/carbon monoxide copolymers and their mixtures with other polymers such as, for example, polyamides.

4. Hydrocarbon resins (for example, $C_5$-$C_9$) comprising their hydrogenated modifications (for example, adhesive resins) and mixtures with polyalkylene and starch.

5. Polystyrene, poly(p-methylstyrene), poly (α-methylstyrene).

6. Copolymers of styrene or α-methylstyrene with dienes or acrylic derivatives such as, for example, styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures, having a high impact strength, between copolymers of styrene and another polymer such as, for example, a polyacrylate, a polymer of a diene or an ethylene/propylene/diene terpolymer, block copolymers of styrene such as, for example, styrene/butadiene/styrene, styrene/isoprene/styrene, styrene/ethylene/butylene/styrene or styrene/ethylene/proplene/styrene.

7. Grafted copolymers of styrene or of α-methylstyrene such as, for example, styrene in polybutadiene, styrene in polybutadiene/styrene or polybutadiene/acrylonitrile copolymers; styrene and acrylonitrile (or methacrylonitrile) in polybutadiene; styrene, acrylonitrile and methylmethacrylate in polybutadiene; styrene and maleic anhydride in polybutadiene; styrene, acrylonitrile and maleic anhydride or maleimide in polybutadiene; styrene and maleimide in polybutadiene; styrene and alkylacrylates or alkylmethacrylates in polybutadiene; styrene and acrylonitrile in ethylene/propylene/diene terpolymers, styrene and acrylonitrile in polyalkyl acrylates or polyalkyl methacrylates, styrene and acrylonitrile in acrylate/butadiene copolymers, as well as mixtures of the copolymers listed above with the copolymers cited under point (6) such as, for example, mixtures of known copolymers such as ABS, MBS, ASA or AES.

8. Polymers containing halogens such as, for example, polychloroprene, chlorinated rubbers, chlorinated or brominated isobutylene-isoprene copolymers ("halobutyl rubber"), chlorinated or chlorosulfonated polyethylene, ethylene and chlorinated ethylene copolymers, homopolymers and copolymers of epichlorohydrin, in particular polymers of vinyl compounds containing halogens such as, for example, polyvinyl chloride, polyvinylidene chloride, polyvinyl fluoride or polyvinylidene fluoride; and also their copolymers such as, for example, vinyl chloride/vinylidene chloride, vinyl chloride/vinyl acetate or vinylidene-chloride/vinyl acetate.

9. Polymers deriving from α,β-unsaturated acids and their derivatives such as, for example, polyacrylates and polymethacrylates, polymethyl methacrylates, polyacrylamides and polyacrylonitriles, impact-modified with butyl acrylate.

10. Copolymers of monomers according to point (9) with each other or with other unsaturated monomers such as, for example, acrylonitrile/butadiene copolymers, acrylonitrile/alkyl acrylate copolymers, acrylonitrile/alkoxyalkyl acrylate copolymers or acrylonitrile/vinyl halide copolymers or acrylonitrile/alkyl methacrylate/butadiene terpolymers.

11. Polymers deriving from unsaturated alcohols and amines, or their acyl or acetal derivatives such as, for example, polyvinyl alcohol, polyvinyl acetate, polyvinyl stearate, polyvinyl benzoate, polyvinyl maleate, polyvinyl butyral, polyallyl phthalate or polyallyl melamine; and also their copolymers with the olefins listed under point (1).

12. Homopolymers and copolymers of open-chain ethers or cyclic ethers such as, for example, polyalkylene glycols, polyethylene oxide, polypropylene oxide, or copolymers of the compounds described above with bis-glycidyl ethers.

13. Polyacetals such as, for example, polyoxymethylene and those polyoxymethylenes containing comonomers, for example, ethylene oxide; polyacetals modified with thermoplastic polyurethanes, acrylates or MBS.

14. Polyphenylene oxides and sulfides and their mixtures with styrene polymers or polyamides.

15. Polyurethanes deriving from hydroxyl-terminated polyethers, polyesters or polybutadienes on the one hand and aliphatic or aromatic polyisocyanates on the other, as well as their precursors.

16. Polyamides and copolyamides deriving from diamines and dicarboxylic acids and/or aminocarboxylic acids or from the corresponding lactams such as, for example, polyamide 4, polyamide 6, polyamide 6/6, 6/10, 6/9, 6/12, 4/6, 12/12, polyamide 11, polyamide 12, aromatic polyamides obtained starting from m-xylene diamine and adipic acid; polyamides prepared from hexamethylenediamine and isophthalic and/or terephthalic acid and with or without an elastomer as modifier, for example, poly-2,4,4-trimethylhexamethylene terephthalamide or poly-m-phenylene isophthalamide; and also block copolymers of the above polyamides with polyolefins, olefinic copolymers, ionomers or elastomers chemically bound or grafted; or with polyethers such as, for example, polyethylene glycol, polypropylene glycol or polytetramethylene glycol; as well as polyamides or copolyamides modified with EPDM or ABS; and polyamides condensed during processing ("RIM polyamide system").

17. Polyureas, polyimides, polyamide-imides, polyetherimides, polyesterimides, polyhydantoins, and polybenzoimidazoles.

18. Polyesters deriving from dicarboxylic acids and diols and/or from hydroxycarboxylic acids or from the corresponding lactones such as, for example, polyethylene terephthalate, polybutylene terephthalate, poly-1,4-dimethylolcyclohexane terephthalate and polyhydroxybenzoates, as well as block copolyether esters deriving from polyethers with hydroxyl-terminated groups; and also polyesters modified with polycarbonates or MBS.

19. Polycarbonates and polyester carbonates.

20. Polysulfones, polyethersulfones and polyetherketones.

21. Cross-linked polymers deriving from aldehydes on the one hand and from phenols, urea and melamines on the other, such as, for example, phenol/formaldehyde resins, urea/formaldehyde resins and melamine/formaldehyde resins.

22. Drying or non-drying alkyd resins.

23. Resins based on unsaturated polyesters deriving from copolyesters of dicarboxylic acids saturated and unsaturated with polyhydric alcohols and vinyl compounds as cross-linking agents, and also the above resins containing halogens and having a good flame-resistance.

24. Cross-linkable acrylic resins deriving from substituted acrylates such as, for example, epoxy acrylates, urethane acrylates or polyester acrylates.

25. Alkyd resins, resins based on polyesters or acrylated resins cross-linked with melamine resins, resins based on urea, resins based on isocyanates, resins based on isocyanurates, resins based on polyisocyanates or epoxy resins.

26. Cross-linked epoxy resins deriving from aliphatic, cycloaliphatic, heterocyclic or aromatic glycidyl compounds such as, for example, products of diglycidyl ethers of bisphenol A and bisphenol F, which are cross-linked with the usual cross-linking agents such as, for example, anhydrides or amines, in the presence of or without accelerating agents.

27. Natural polymers such as, for example, cellulose, rubber, gelatin, and their derivatives chemically modified to give homologous polymers such as, for example, cellulose acetates, propionates and butyrates, or cellulose ethers such as, for example, methyl-cellulose; as well as hydrocarbon resins ("rosins") and their derivatives.

28. Mixtures of the above polymers ("polyblends") such as, for example, PP/EPDM, polyamides/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylates, POM/MBS, PPO/HIPS, PPO/PA 6.6 and copolymers, PA/HDPE, PA/PP, PA/PPO, PBT/PC/ABS, PBT/PET/PC.

29. Natural or synthetic organic materials which are pure monomeric compounds or mixtures of said compounds, such as, for example, mineral oils, animal or vegetable oils, fats or waxes, oils, fats or waxes based on synthetic esters (for example, phthalates, adipates, phosphates, trimellitates), as well as mixtures of synthetic esters with mineral oils in any weight ratio, in particular those used in spinning compositions, as well as aqueous emulsions of said organic materials.

30. Aqueous emulsions of natural or synthetic rubbers such as, for example, natural latex or latexes based on carboxylated styrene-butadiene copolymers.

The present invention also relates to polymeric compositions containing an organic polymer and an effective quantity of one of the above mixtures of additives.

The mixtures of additives, object of the present invention, are particularly useful in the stabilization and dyeing of organic polymers selected from those listed above.

A further object of the present invention relates to the end-products obtained from the processing of the above polymeric compositions.

The mixtures of additives, object of the present invention, are added to the organic polymers to be stabilized in a quantity ranging from 0.01% to 5% with respect to the total weight of the polymer to be stabilized, preferably from 0.05% to 3%, even more preferably from 0.1% to 1%.

The mixtures of additives, object of the present invention, can be incorporated into the organic polymer to be stabilized by means of the known techniques.

The mixtures of additives, object of the present invention, are obtained, as already mentioned, by the extrusion of powder mixtures of the different components, operating at such a temperature as to ensure that at least a small part of the lowest-melting component melts.

A solid "spaghetto" is thus obtained which, after appropriate cooling, can be granulated by cutting at the extruder head or by subsequent fragmentation.

The molten part of the lowest-melting component, on resolidifying, acts as a gluing agent for the remaining components: in this way the solid "spaghetto" is formed and is subsequently cooled and cut as described above.

Some illustrative but non-limiting examples are provided for a better understanding of the present invention and for its embodiment.

EXAMPLE 1

22.98 g of octadecyl 3-(3',5'-di-t-butyl-4'-hydroxyphenyl) propionate (known under the trade-name of ANOX PP18 of Great Lakes Chemical Corporation), 61.30 g of tris(2,4-di-t-butylphenyl)phosphite (known under the trade-name of ALKANOX 240 of Great Lakes Chemical Corporation), 114.94 g of calcium stearate and 0.78 g of "Ultramarine Violet" of Whittaker, Clark & Daniels, are charged into a planetary powder mixer.

The above homogenized mixture is fed to a Brabender laboratory extruder having a screw feeder of 475 mm in length, 19 mm in diameter and with a compression ratio of 1:4, which has the possibility of differentiated heating in four different zones of the screw feeder. The mixture is extruded through a 2.5 mm diameter hole, with a rotation rate of the screw feeder of 90 rpm and a temperature profile of 150° C., 135° C., 110° C., 130° C.

A "spaghetto" is obtained which, after cooling to room temperature, is cut up into violet granules, not containing powders, having dimensions of about 2-2.5 mm.

The invention claimed is:

1. A granular mixture consisting essentially of:
    (a) one or more stabilizers for organic polymers selected from the group consisting of phosphites, phosphonites, alkylated monophenols, alkylthiomethylphenols, hydroquinones, alkylated hydroquinones, tocopherols, triazine compounds, benzylphosphonates, esters of β-(3,5-di-t-butyl-4-hydroxyphenyl)propionic acid with monohydric or polyhydric alcohols, esters of β-(3,5-dicyclohexyl-4-hydroxyphenyl) propionic acid with monohydric or polyhydric alcohols, esters of 3,5-di-t-butyl-4-hydroxyphenyl acetic acid with monohydric or polyhydric alcohols, amides of β-(3,5-di-t-butyl-4-hydroxyphenyl)propionic acid, ascorbic acid, hydroxylamines, nitrones; plus
    (b) one or more of the group consisting of organic pigments and dyes;
    (c) and optionally one or more additive selected from the group consisting of plasticizers, lubricants, catalysts, slip agents, optical brighteners, flame-retardants, antistatic agents, blowing agents, calcium carbonate, silicates, talc, kaolin, mica, barium sulfate, metal oxides, metal hydroxides, carbon black, graphite, salts of alkaline metals of fatty acids, and salts of alkaline earth metals of fatty acids;
    glued as a mixture by the component having the lowest melting point of said components.

2. The granular mixture according to claim 1 wherein the organic pigments are selected from the group consisting of organic pigments of the azo type, azomethines, anthraquinones, perilenes, dioxazines, thioindigo reds, quinacridones, phthalocyanines, blue indanthroines, carbazoles, isoindolinones, isoindolones, benzimilazolinones, and their metal salts.

3. The granular mixture according to claim 1 wherein the dyes are soluble, or slightly soluble in water.

4. The granular mixture according to claim 1 wherein the dyes are insoluble in water.

5. The granular mixture according to claim 3 wherein the dyes are selected from the group consisting of acid dyes, aminoketones, ketone-imines, methines, nitrodiphenylamines, quinolines, aminonapthoquinones, coumarins, anthroquinones, and azo dyes.

6. The granular mixture according to claim 3 wherein the dyes contain one or more anionic groups.

7. The granular mixture according to claim 3 wherein the dyes are selected from the group consisting of anthraquinones, phthalocyanines, diarylmethane and triarylmethane; methine, polymethine and azomethine; thiazoles, ketone-imines, acridines, cyanines, nitro dyes, quinolines, benzimidazoles, xanthenes, azines, oxazines, thiazines and triazines which have at least one quaternary nitrogen in the molecule.

8. The granular mixture according to claim 1 wherein the dyes are selected from the group consisting of dyes containing sulfur, disperse dyes and vat dyes.

9. The granular mixture according to claim 8 wherein the disperse dyes are selected from the group consisting of nitro dyes, aminoketones, ketone-imines, methines, polymethines, diphenylamines, quinolines, benzimidazoles, xanthene, oxazines, aminonaphthoquinones, and coumarins which do not contain carboxylic acid or sulfonic acid groups.

10. The granular mixture according to claim 6 wherein the anionic groups are selected from the group consisting of carboxylic acid groups; sulfonic acid groups, and their salts.

11. The granular mixture according to claim 1 wherein the at least one or more stabilizers for organic polymers (a) is selected from the group consisting of phosphites, phosphonites, alkylated monophenols, tocopherols, triazine compounds, esters of β-(3,5-di-t-butyl-4-hydroxyphenyl)propionic acid with monohydric or polyhydric alcohols, esters of 3,5-di-t-butyl-4-hydroxyphenyl acetic acid with monohydric or polyhydric alcohols; and and at least one additive (c) selected from the group consisting of flame-retardants, calcium carbonate, silicates, talc, kaolin, mica, barium sulfate, metal oxides, metal hydroxides, carbon black, graphite, salts of alkaline metals of fatty acids, and salts of alkaline earth metals of fatty acids is present.

12. The granular mixture according to claim 11 wherein the at least one or more of the stabilizers for organic polymers (a) is selected from the group consisting of phosphites, phosphonites, and esters of β-(3,5-di-t-butyl-4-hydroxyphenyl)propionic acid with monohydric or polyhydric alcohols.

13. The granular mixture according to claim 1 consisting essentially of
   (a) at least one or more stabilizers for organic polymers selected from the group consisting of phosphites, phosphonites, alkylated monophenols, tocopherols, triazine compounds, esters of β-(3,5-di-t-butyl-4-hydroxyphenyl)propionic acid with monohydric or polyhydric alcohols, esters of 3,5-di-t-butyl-4-hydroxyphenyl acetic acid with monohydric or polyhydric alcohols;
   (b) one or more of the group consisting of organic pigments and dyes; and
   (c) optionally or more additive selected from the group consisting of calcium carbonate, silicates, talc, kaolin, mica, barium sulfate, metal oxides, metal hydroxides, salts of alkaline metals of fatty acids, and salts of alkaline earth metals of fatty acids is present.

* * * * *